(12) United States Patent
Eom et al.

(10) Patent No.: US 9,273,845 B2
(45) Date of Patent: Mar. 1, 2016

(54) LIGHTING DEVICE

(75) Inventors: Jun Phill Eom, Seoul (KR); Dong Mug Seong, Seoul (KR); Beom Sun Hong, Seoul (KR); Dong Hyun Lee, Seoul (KR); Yong In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/130,175

(22) PCT Filed: Jun. 29, 2012

(86) PCT No.: PCT/KR2012/005160
§ 371 (c)(1),
(2), (4) Date: Dec. 30, 2013

(87) PCT Pub. No.: WO2013/002594
PCT Pub. Date: Jan. 3, 2013

(65) Prior Publication Data
US 2014/0140068 A1   May 22, 2014

(30) Foreign Application Priority Data

Jun. 29, 2011   (KR) .................. 10-2011-0063455

(51) Int. Cl.

| | |
|---|---|
| *F21V 5/00* | (2015.01) |
| *G02B 3/00* | (2006.01) |
| *G02B 5/02* | (2006.01) |
| *F21V 8/00* | (2006.01) |
| *F21Y 101/02* | (2006.01) |
| *F21Y 105/00* | (2006.01) |

(52) U.S. Cl.
CPC .................. *F21V 5/002* (2013.01); *F21V 5/004* (2013.01); *F21V 5/008* (2013.01); *G02B 3/0056* (2013.01); *G02B 5/0215* (2013.01); *G02B 5/0278* (2013.01); *G02B 6/0053* (2013.01); *F21Y 2101/02* (2013.01); *F21Y 2105/001* (2013.01)

(58) Field of Classification Search
CPC ........ F21V 5/002; F21V 5/004; G02B 3/0056
See application file for complete search history.

(56) References Cited

U.S. PATENT DOCUMENTS 8,177,382 B2 * 5/2012 Roberts et al. ............... 362/97.4
2007/0019415 A1   1/2007 Leblanc et al.
(Continued)

FOREIGN PATENT DOCUMENTS

CN   101322054 A   12/2008
CN   10-2052606 A   5/2011
(Continued)

OTHER PUBLICATIONS

International Search Report in International Application No. PCT/KR2012/005160, filed Jun. 29, 2012.
(Continued)

*Primary Examiner* — Elmito Breval
(74) *Attorney, Agent, or Firm* — Saliwanchik, Lloyd & Eisenschenk (57) ABSTRACT

The present invention relates to an lighting device capable of reducing UGR (Unified Glare Rating) characterized by comprising the frame portion formed at the peripheral area in which the printed circuit board mounted with a light source and the light source are arranged, and the inserting portion into which the diffusing plate and the optical plate are inserted at the inside of the frame portion simultaneously. Particularly, an air gap can be formed on the closed adhered surface of the optical plate and the diffusing plate.

18 Claims, 6 Drawing Sheets

(56) References Cited

U.S. PATENT DOCUMENTS

| | | | |
|---|---|---|---|
| 2008/0084693 A1 | 4/2008 | Shimada et al. | |
| 2010/0027240 A1* | 2/2010 | Chang | 362/97.1 |
| 2010/0033952 A1* | 2/2010 | Chang | 362/97.1 |
| 2011/0292302 A1* | 12/2011 | Park et al. | 348/739 |
| 2012/0020078 A1* | 1/2012 | Chang | 362/235 |
| 2012/0020079 A1* | 1/2012 | Chang | 362/235 |

FOREIGN PATENT DOCUMENTS

| | | |
|---|---|---|
| JP | 2004191611 A | 7/2004 |
| JP | 2009-016093 A | 1/2009 |
| JP | 2010-039091 A | 2/2010 |
| KR | 10-0215127 | 8/1999 |
| KR | 10-2007-0010478 A | 1/2007 |
| KR | 10-2009-0015401 A | 2/2009 |
| TW | 200604467 A | 2/2006 |
| TW | 200923501 A | 6/2009 |
| TW | 200937083 A | 9/2009 |

OTHER PUBLICATIONS

European Search Report in International Application No. PCT/KR2012/005160, filed Jun. 29, 2012.

Office Action dated Apr. 28, 2015 in Taiwanese Application No. 101123572.

Office Action dated Apr. 20, 2015 in Chinese Application No. 201280032767.1.

* cited by examiner

| | (a)Diffusion plate | (b)Diffusion plate + Micro-lens array |
|---|---|---|
| CRI | 81 | 81 |
| Flux(lm) | 4377.0 | 4201.9 |
| Luminous efficacy(lm/W) | 81 | 77.7 |
| Efficiency(%) | 100 | 96 |
| UGR* [600*600, 4000lm] | 20.8 / 20.8 | 18.6 / 18.4 |
| Light Distribution | | |
| Cone Lux Levels | | |

* UGR : Unified Glare Rating

$$Sag = \frac{height}{diameter}$$

| fill factor | UGR(endwise) | UGR(crosswise) |
|---|---|---|
| 82% | 16.3 | 16.2 |
| 78% | 16.5 | 16.4 |
| 75% | 16.6 | 16.5 |
| 72% | 16.7 | 16.6 |
| 69% | 16.8 | 16.7 |
| 66% | 16.9 | 16.8 |
| 63% | 16.9 | 16.9 |
| 60% | 17 | 17 |
| 58% | 17 | 17.1 |
| 56% | 17.1 | 17.1 |
| 54% | 17.2 | 17.2 |
| 52% | 17.3 | 17.3 |
| 50% | 17.3 | 17.3 |

LIGHTING DEVICE

CROSS-REFERENCE TO RELATED APPLICATIONS

This application is the U.S. national stage application of International Patent Application No. PCT/KR2012/005160, filed Jun. 29, 2012, which claims priority to Korean Application No. 10-2011-0063455, filed Jun. 29, 2011, the disclosures of each of which are incorporated herein by reference in their entirety.

TECHNICAL FIELD

The present invention relates to a lighting device capable of reducing UGR (Unified Glare Rating) value.

BACKGROUND ART

Generally, lighting is an activity or function to light a certain place up using various light sources with a particular purpose. Lighting is mostly used to make an environment brighter in the night or in the dark.

Figure 1:
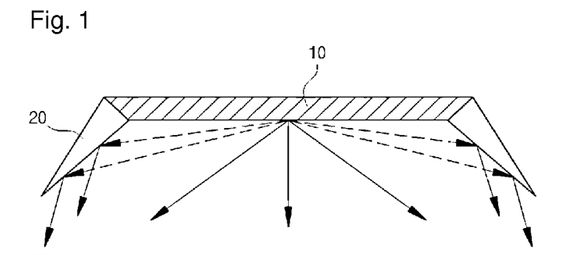
FIG. 1 is a cross-sectional view showing a flat lighting device according to an embodiment of a prior art.

FIG. 1 is a cross-sectional view showing a flat lighting device according to a prior art. Referring to FIG. 1, the lighting device according to a prior art includes a light source 10 and a louver or a reflecting shade 20. As for the light sources 10, incandescent light bulb, LED, CCFL, or the like may be used. Referring to FIG. 1, a light having an angle denoted with dotted line causes visually discomfort to a person when it is transferred to the person. Such a lighting device may reduce UGR mechanically, but cannot be a perfect flat lighting aesthetically.

Figure 2:
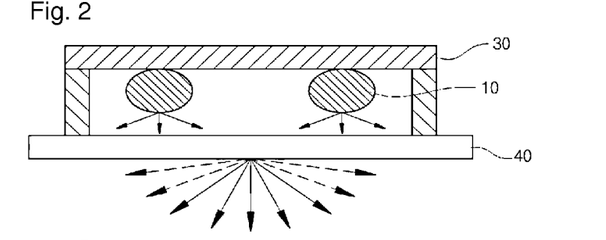
FIG. 2 is a cross-sectional view showing the flat lighting device according to an embodiment of prior art.

FIG. 2 is a cross-sectional view showing a flat lighting device according to an embodiment of a prior art. Referring to FIG. 2, a lighting unit 30 includes a light source 10 and a diffusion plate 40 for diffusing a light emitted from the light source 10. The light emitted from the light source 10 is discharged outside through the diffusion plate 40. The diffusion plate 40 is used for reducing hot spot from the light source and emitting uniform light. Even if the diffusion plate 40 is used, as shown in FIG. 2, a light with the angle denoted with dots still render discomfort to eyes of a person. Namely, since the diffusion plate 40 scatters a beam up to the direction in which UGR is high enough causing fatigue of the eyes due to the glaring, so such a diffusion plate cannot conform with the standard of indoor flat lighting device. Accordingly, it is important to reduce the glaring to the eyes in indoor flat lighting. The extent of discomfort caused from the glaring to the eyes is represented using a constant called UGR (Unified Glare Rating). In other words, UGR is a value calculated by quantifying the extent of discomfort to the user of a lighting device.

UGR is calculated as a value of light flux emitting at the angle between 65 deg and 90 deg when a direction facing a bottom surface from a ceiling provided with a lighting device is set to 0 deg and a direction parallel to the ceiling is set to 90 deg. That is, the glaring to the eyes will reduce when the light flux at 65 deg-90 deg is reduced. In Europe and US, an indoor lighting device has to be below 19 of UGR.

DISCLOSURE OF INVENTION

Technical Problem

Like this, most currently used indoor flat lighting devices reduce the light spreading angle into a broad range which affects UGR, by using reflecting shades or louver, or burying the whole lighting device. According to the prior art, even though the diffusion plate is used, the influence of hot spot may be reduced, but still is not conformable with UGR standard below 19.

Solution to Problem

The present invention has been proposed to solve the drawbacks as described in the forgoing. In order to resolve the drawbacks, the object of the present invention relates to provide a lighting device capable of incorporating an efficient UGR standard through the reduction of light flux emitting from the angle between 65 deg and 90 deg by adjusting sag or Fill Factor of an optical plate with a configuration wherein a micro-lens array is patterned on a transparent plate.

Advantageous Effects of Invention

As a measures to resolve the drawbacks, the present invention provides a lighting device comprising a printed circuit board mounted with a light source, a frame portion formed in the peripheral an area where a light source is arranged, and an inserting portion into which the diffusing plate and the optical plate are simultaneously inserted at the inside of the frame portion, and thus light flux is reduced by forming a natural air layer between the diffusing plate and the optical plate to establish an efficient UGR standard.

Additionally, in the present invention, the effect described above may be obtained by establishing the frame portion into a separable type configuration, by utilizing a spaced portion as the inserting portion in connective configuration of the separable frame and by fixing the diffusing plate and optical plate into the inserting portion simultaneously.

BRIEF DESCRIPTION OF DRAWINGS

The above and other aspects, features and advantages of certain exemplary embodiments of the present invention will be more apparent from the following description taken in conjunction with the accompanying drawings, in which.

MODE FOR THE INVENTION

Hereinafter, embodiments of the present invention are described below in detail, with reference to the accompanying views. However, the present invention may be implemented in various and different forms and not limited to the embodiments described here. In addition, in order to clearly describe the present invention, parts that are not related with the description are omitted, and the same reference numerals will be used to refer to the same elements throughout the specification.

Figure 3:
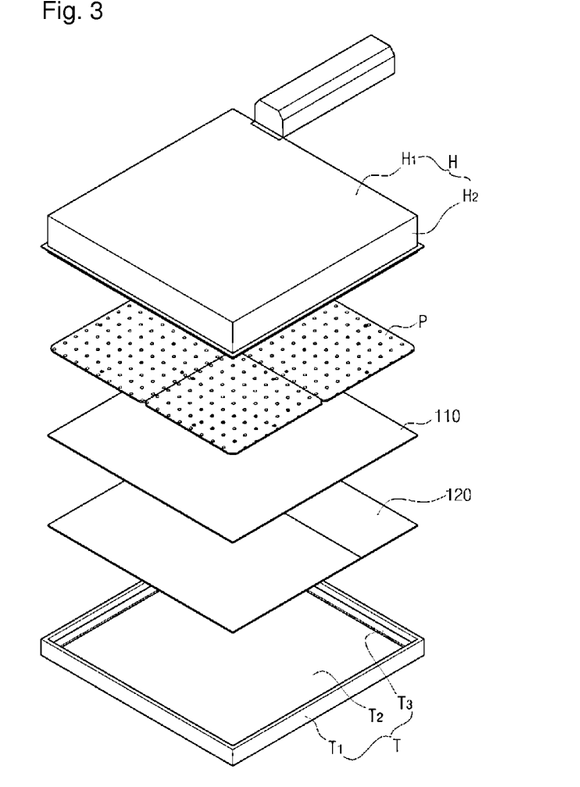
FIGS. 3 to 4 are separate perspective view and combined perspective view, respectively, showing the lighting device according to the present invention.
Figure 4:
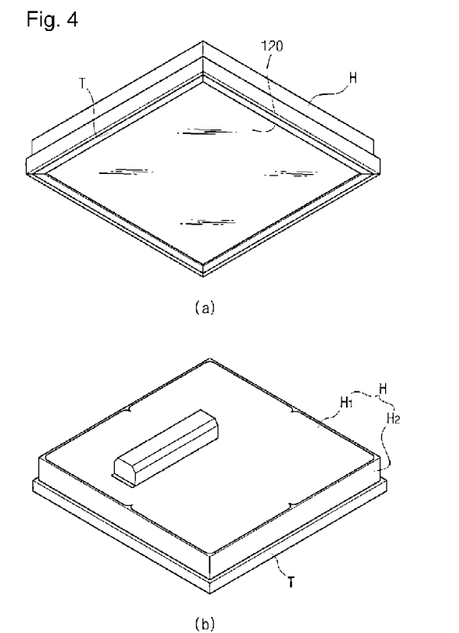

FIGS. 3 to 4 are separate perspective view and combined perspective view, respectively, showing the lighting device according to the present invention.

The lighting device according to the present invention may include a printed circuit board within which a light source is mounted, the frame portion formed at the peripheral section of the area where a light source is arranged, and an inserting portion inside the frame portion, into which the diffusing plate and the optical plate are inserted simultaneously. That is, the lighting device is characterized in that the diffusing plate and the optical plate are inserted and fixed as a stacked configuration to the inserting portion of single groove formed at the inside of the frame portion. For instance, the configuration in FIG. 3 is an exemplary embodiment of a configuration where the frame portion (H, F) is separable. However, differently from this instance, a groove may be formed into which the diffusing plate 110 and the optical plate 120 illustrated in FIG. 3 are inserted simultaneously while forming the frame portion integrally. In case of inserting the diffusing plate and optical plate as a stacked configuration simultaneously, additional adhesive agent is not required to the closely adhered surface of the diffusing plate and optical plate, and thus a natural air layer (hereinafter, referred to as 'air gap') is formed, and properties of the light may be improved.

From now on, in addition to such an integrated configuration, an embodiment to configure the frame portion as a separable configuration will be described.

That is, the configuration shown in FIG. 3 may be formed into a separable type of the frame portion (H, F) with the first frame (H) and the secondary frame (F). The configuration may form the inserting portion by establishing the spaced portion in the configuration combining the first frame (H) and the secondary frame (F) wherein the diffusing plate 110 and the optical plate 120 are inserted into the inserting portion simultaneously to form a natural air gap.

In more detail, the lighting device may include a first frame (H) comprising a base portion (H1) in which the printed circuit board mounted with a light source is arranged and a border partition wall (H2) being formed at the shell of the base portion, and a secondary frame (T) comprising the shell frame (T1) which corresponds to the border partition wall (H2) and whose central part (T2) is opened and the guide frame (T3) being bent in the direction of the central part at the shell frame and a guide frame (T3) bent from the shell frame toward the center direction. Especially in this instance, the spaced portion (110 in FIG. 5) has to be formed in the combined configuration of the first frame and the secondary frame and the diffusing plate 110 and the optical plate 120 may be inserted and fixed to the spaced portion simultaneously. That is, the configuration of the secondary frame (T) includes the diffusing plate (110) for light diffusion whose one end is inserted and fixed to the guide frame (T3) and the optical plate (120) for light collection forming a micro-lens pattern wherein the air gap may be formed at the closely adhered surface with the diffusing plate. Particularly, the first frame (H) has an opened configuration at front part corresponding to the base portion (H1) and the printed circuit board (P) mounted with a light source is installed in the surface of the inside of the base portion (H1). In addition, a reflecting layer (not shown) may further formed on the surface of the printed circuit board and the internal surface of the lighting device body so as to improve light reflection efficiency.

Further, as shown in FIG. 4, the secondary frame (T) being formed so as to cover the border partition wall of the first frame (H) at the upper part mat be provided with a shape corresponding to the border partition wall of the first frame (H) and fitted thereto. In addition, as the configuration shown in FIG. 3, the diffusing plate 110 and the optical plate 120 are connected as a configuration to be inserted and fixed to the inserting portion formed by the upper part of border partition wall and the secondary frame (T), and in this case, the optical plate 120 surface is exposed at the central part of the upper frame (T) as shown in FIG. 4 (a).

Figure 5:
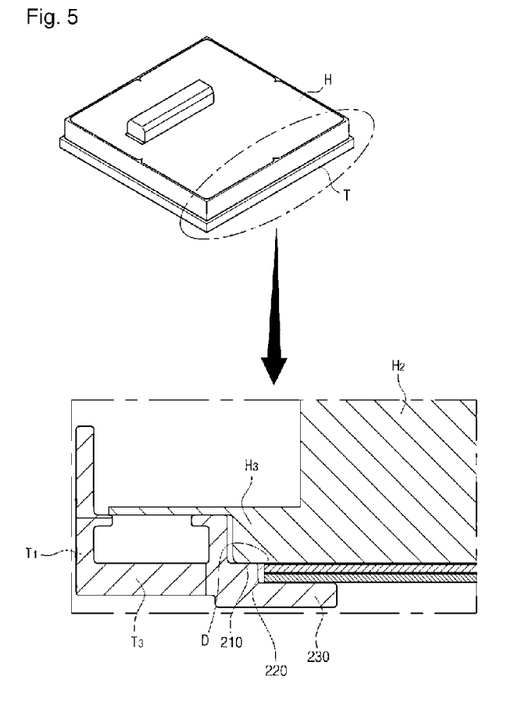
FIG. 5 is a perspective view showing a section of the combining portion in the combined configuration of main body of the lighting unit and an upper frame according to the present invention.

FIG. 5 is a perspective view showing a cross section of a connecting portion in a connection configuration of the first frame (H) and the secondary frame (T) according to the present invention.

Referring to the drawing, the border partition wall (H2) of the first frame (H) according to the present invention is a partition wall configuration erected in vertical direction at the base portion, and in the upper part of the border partition wall (H2) a partition wall supporting portion (H3) may be protruded in the horizontal direction to the partition wall. A part of the partition wall supporting portion (H3) in the upper surface of the border partition wall (H2) may be connected as a configuration supported by engaging with the secondary frame (T).

Especially, in the present invention, the secondary frame (T) may be configured to include the shell frame (T1) being formed in the vertical direction and the guide frame (T3) being bent by connecting with the shell frame.

Especially, the guide frame (T3) may be configured to include the first guide portion 210 where the upper part of the border partition wall and an end of the guide frame are adhered closely, and the secondary guide portion 230 comprising the spaced portion 220 being spaced from the upper surface of the border partition wall by forming a step (D) at the first guide portion 210. The spaced portion 220 is configured such that the diffusing plate 110 and the optical plate 120 may be inserted and stacked into a single groove of the inserting portion simultaneously.

In other words, the diffusing plate 110 and an end of the optical plate 120 may be inserted and fitted into the spaced portion 220 formed by the upper surface of the border partition wall (H2) and the guide frame (T3). Such a configuration will form a natural air gap between the diffusing plate and the optical plate.

Figure 6:
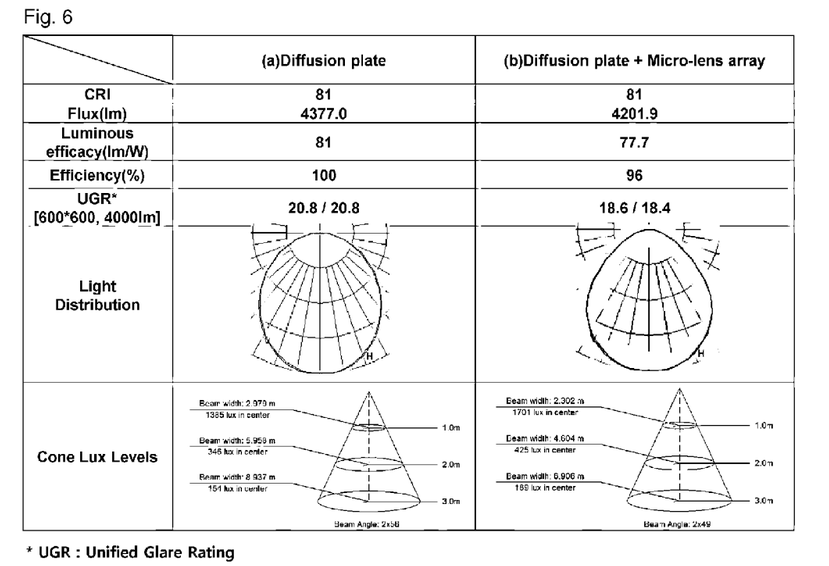
FIG. 6 is a comparative table comparing performance results of two configurations to be inserted into a guide frame of the lighting unit according to the present invention; (a) a configuration implementing the diffusing plate only, and (b) another configuration installing the diffusing plate and the optical plate closely and forming an air gap between the diffusing plate and the optical plate.

Such an air gap enables to reduce UGR in such a manner that a beam emitted from a light source passes through the diffusing plate 110 and the beam which passed through the diffusing plate is refracted by the air gap and goes into the optical plate 120 in the lower part, and accordingly, the beam scattering from side to side greatly among the beams applied to the air gap after passing through the diffusing plate is refracted and advances towards the optical plate. In particular, the value of UGR may be adjusted in such a manner that through a micro-lens pattern array formed in a surface of the optical plate 120 according to the present invention the beam which passed through the air gap is refracted once more while collecting the light of the beam which passed through the air gap to the part to shine and diffusing the light. FIG. 6 is a comparative table comparing performance results of two configurations to be inserted into the inserting portion of the lighting unit according to the present invention; (a) a configuration establishing the diffusing plate only, and (b) another configuration installing the diffusing plate and the optical plate closely and forming an air gap between the diffusing plate and the optical plate.

As shown in the table, performances such as light efficiency, illumination intensity, etc. are almost similar in both configurations, however the value of UGR is adjusted to have a value below 19.0 in configuration (b) wherein the diffusing plate and the optical plate are located closely with each other and an air gap is formed between the diffusing plate and the optical plate. This can be also confirmed from a light distribution chart. In the light distribution chart, the light distribution itself has a narrower oval shape in configuration (b) and UGR value has a range between 18'4~18'6, when comparing (a) a configuration establishing the diffusing plate only with (b) another configuration installing the diffusing plate and the optical plate closely and forming an air gap between the diffusing plate and the optical plate.

Particularly, when comparing the correlation of light distribution through the conceptual view of analysis on illumination intensity level (Cone Lux Levels), beam angle has an oval shape whose light distribution is narrowed in configuration (b) showing beam angles in (a) 2×56 and (b) 2×49 respectively, and it can be checked that the effect of the improvement of the illumination intensity is higher in configuration (b), from the fact that central illumination intensity (lux in center (at 3 m)) are 154 lux in configuration (a) and 189 lux in configuration (b).

In other words, the configuration (b) where the diffusing plate and the optical plate are closely located and an air gap is formed satisfies the regulation of UGR below 19, and it can be confirmed that configuration (b) collects more beam and shows higher illumination intensity, referring beam angle values and illumination intensities of the cone lux in consideration of light distribution and UGR values.

Figure 7:
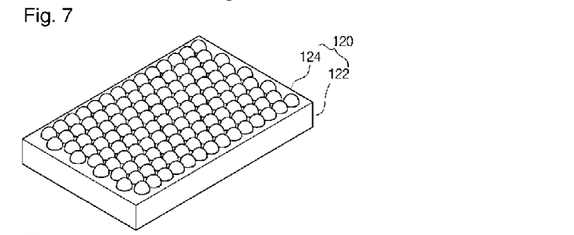
FIG. 7 is a view showing an embodiment of a configuration of the optical plate applied to the lighting unit according to the present invention.

FIG. 7 is a view showing an embodiment of a configuration of the optical plate applied to the lighting unit according to the present invention.

It is preferable for the optical plate 120 according to the present invention to provide a plurality of micro-lens pattern 124 on a base plate 122 basically.

In particular, UGR may be reduced through the sag adjustment of lens pattern in this embodiment in order to reduce UGR using the optical plate forming such a micro-lens pattern 124.

Figure 8:
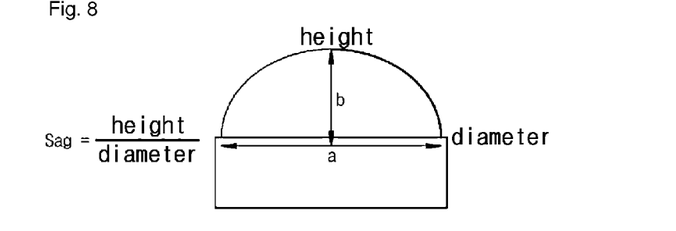
FIG. 8 is a view showing sag of an unit lens pattern.

FIG. 8 is a view showing sag of the unit lens pattern. As shown in FIG. 8, sag represents the lens height (b) to the lens diameter and it can be expressed as {Equation 1} in the follow;

$$\text{Sag} = (\text{the lens height})/(\text{the lens diameter}) \quad \{\text{Equation 1}\}$$

The higher Sag of each lens of the micro-lens pattern array (MLA), the beam will be refracted more abruptly towards the direction of facing the bottom surface from the ceiling, and UGR will be reduced accordingly.

However, sag of the lens of the micro-lens array generates side light leakage phenomenon referred to as side-lobe in certain section, causing a failure to comply with UGR standard. Moreover, the higher sag of lens, recycle phenomenon of the beam returning to the direction of origination develops more severely and thereby causing more reflection to reduce the light efficiency.

That is, when sag of lens is too high (when sag is 0.35 or above), UGR standard will be satisfied but the light efficiency will be reduced. Additionally, when sag of lens is too low (when sag is 0.1 or less), deterioration of the light efficiency will be minimized however UGR standard will not be satisfied.

Like this, if the range of light emission is excessively reduced in order to reduce UGR, the light efficiency will be reduced and the area irradiated by the beam will be reduced. In this case, lighting device with higher illumination intensity is required to illuminate identical area compared with a lighting device with low sag of lens. Namely, the higher sag of lens, UGR will be reduced more greatly, however the light efficiency will be reduced (below 90% of the diffusing plate) also.

Accordingly, sag of lens of the micro-lens array minimizing the light efficiency deterioration and maintaining light irradiating area in conformity with UGR standard has to be determined.

Figure 9:
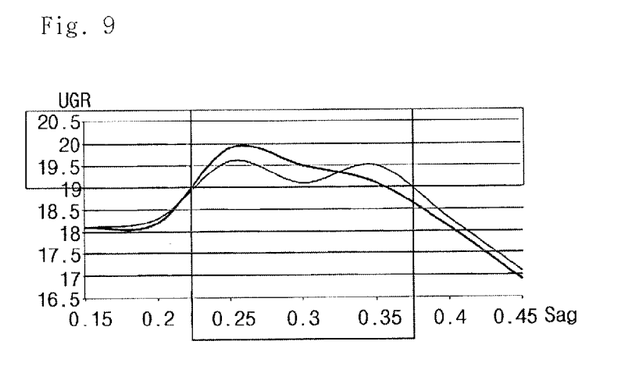
FIG. 9 is a graph indicating a relation between UGR and sag.
Figure 10:
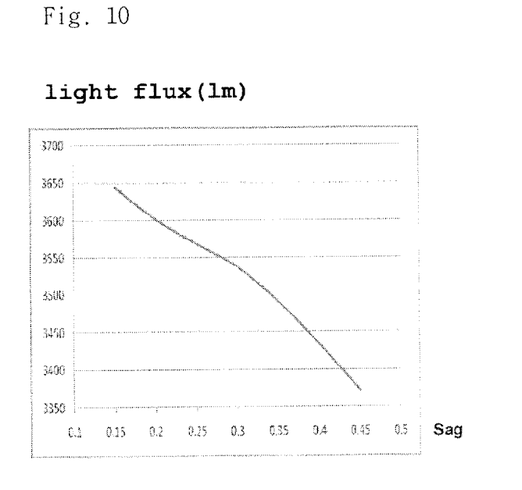
FIG. 10 is a view showing a relation between the light efficiency and sag.

FIG. 9 is a graph indicating a relation between UGR and sag, and FIG. 10 is a view showing a relation between the light efficiency and sag.

In FIGS. 9 to 10, the area of the lighting unit is 600×600 mm and the illumination intensity of the lighting unit is 400 lux.

Referring to FIG. 9, sections of sag of lens with UGR below 19, which is indoor lighting standard, range 0.1~0.22 or 0.35~0.5. In the section where sag of lens ranges 0.25~0.35, UGR is increased on the contrary due to the side-lobe (a phenomenon of light leakage in 65 deg~90 deg). So sag within the section 0.25~0.35 cannot satisfy the indoor lighting standard of UGR below 19. In addition, referring to FIG. 10, the higher sag of lens, the light flux will be reduced more greatly causing deterioration of the light efficiency. Thus, considering the light efficiency, it is exemplary to determine sag of lens within the range of 0.1~0.25 or 0.35~0.5. Like this, when sag of lens is determined to low level, that is, when sag of lens is determined within the range of 0.1~0.25 or 0.35~0.5, UGR may be reduced and the deterioration of the light efficiency may be minimized.

Figure 11:
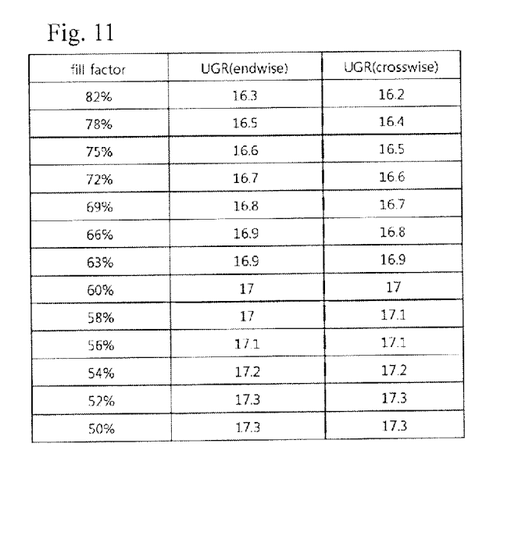
FIG. 11 is a view showing a result of the adjustment of Fill Factor of a micro-lens pattern in order to reduce UGR in the configuration of the optical plate according to the present invention, which is shown in FIG. 7.

FIG. 11 is a view showing a result of the adjustment of Fill Factor of the micro-lens pattern 124 in order to reduce UGR in the configuration of the optical plate according to the present invention, which is shown in FIG. 7.

In other words, as another measure to adjust the reduction in UGR using the optical plate according to the present invention, Fill Factor of a micro-lens pattern 124 according to the present invention may be adjusted. In this case, it is characteristic of Fill Factor of a micro-lens pattern 124 to be within the range of 0.5~1.0 (in this case, Fill Factor is defined as the ratio occupied by the area of the micro-lens pattern per the area of unit base plate).

At this time, as described in FIG. 9 in detail, effects of preventing light flux reduction and reducing UGR may be obtained by adjusting Fill Factor occupied by the area of the micro-lens pattern per the area of unit base plate within the range of 0.5~1.0.

In the present invention, UGR is reduced at the penetration of the beam by setting Fill Factor of the micro-lens pattern formed on the surface of the optical plate 120 penetrated by the beam to 50%~100%. Referring to the drawing, a configuration is illustrated where shape of the micro-lens pattern is arranged uniformly in same shape and size, however, uneven arrangement of the micro-lens pattern in different shape is also available. Further, lens may have any one shape among round, oval, prism, lenticular, R-prism. Especially, in case of 100% of Fill Factor, sectional shape of lens pattern which is not a round shape may be determined to a polygon (hexagon, octagon, etc.).

Figure 12:
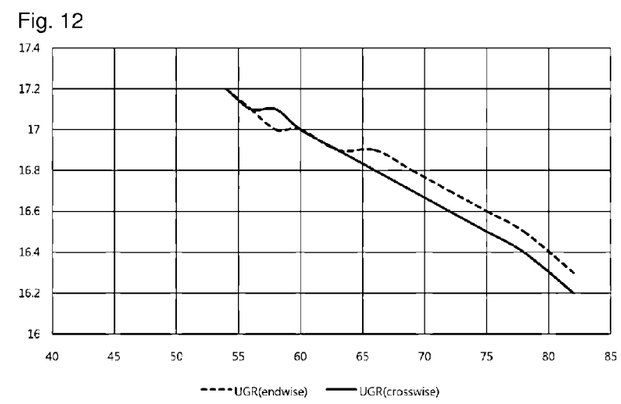
FIG. 12 is a result of UGR simulation depending on Fill Factor of a micro-lens pattern of the optical plate according to the present invention.

Referring to FIGS. 11 to 12, this is the result of UGR simulation according to Fill Factor of the micro-lens pattern of the optical plate according to the present invention (on the basis of lens size: 80 µm, lens sag: 0.45). Referring to the result illustrated, it can be confirmed that in same sag UGR decreases as Fill Factor of lens pattern increases. Especially, as described in detail in prior art, application to the lighting unit is available only when the standard of UGR below 19 is satisfied, however the configuration adjusting Fill Factor of lens pattern of the optical plate according to the present invention may keep UGR value within the range of 16.0~17.0.

Especially, as described in prior art in detail, application to the lighting unit is available only when the standard of UGR below 19 is satisfied. In this respect, the configuration adjusting Fill Factor of lens pattern of the optical plate of the present invention according to the experiment example of FIG. 5 up to 50%~82% can show UGR value within the range of 16.3~17.3. As a matter of course, in case that Fill Factor is set to 82%~100% as in the correlation of the configuration in the experimental data of FIG. 5 suggested in FIG. 6, UGR value is further reduced.

Of course, in case of setting Fill Factor to less than 50%, UGR value may be below 19, however, in this case haze of lens composing the optical plate will be decreased and the light penetration degree will be increased. As a result, hot spot may appear on the outside of the lighting device by the light source such as LED, etc. and the light collecting effect of lens is deteriorated greatly, disabling the function as a lighting device.

In addition, for the material of the base plate 122 of the optical plate 120, transparent synthetic resins such as PC, PMMA or PET film may be used. The micro-lens pattern 124 formed on the surface of the base plate may be made integrally on the surface of the base plate or by the process of patterning to apply additional resins. As an instance, lens pattern may be fabricated by molding integrally with heat and pressure or by hardening the transparent plate by applying resins. It is preferable for the micro-lens pattern 124 to satisfy the range of 20 µm~80 µm for unit lens pattern size, and the range of 0.1~0.5 for Sag (Lens Height (H):Lens Diameter (R)) of the micro-lens pattern).

Particularly, the standard of UGR below 19 can be satisfied by adjusting Fill Factor of the micro-lens pattern within the range of 0.5~1.0 or by setting sag of the micro-lens pattern within the range of 0.1~0.25 or 0.35~0.5. Particularly, in the present invention, the result of reduction in UGR is shown due to the increase of Fill Factor of micro-lens pattern array in the same sag. In the range where sag of lens pattern is high (0.35~0.5), there is drawbacks such as decrease in UGR and deterioration of the light efficiency. By raising Fill Factor in the range where sag of lens pattern is low (0.1~0.25), UGR value may be reduced and deterioration of the light efficiency may be prevented, and thus it is preferable to set sag within the range of 0.1~0.25. Through this configuration, the lighting device may adjust UGR vale to lower level by adjusting Fill Factor of sag to certain value.

Figure 13:
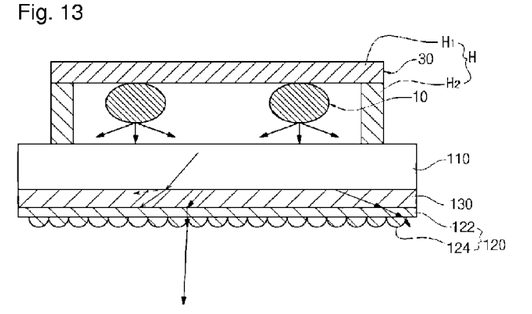
FIG. 13 is an showing another embodiment of the diffusing plate and the optical plate being inserted and secured closely to the guide frame according to the present invention.

FIG. 13 is an illustration of another embodiment of the diffusing plate 110 and the optical plate 120 being inserted and fixed closely to the inserting portion according to the present invention. In FIG. 13, the configurations of the light source and the first frame (H) are schematically illustrated using the configuration described in detail in FIG. 5.

As the configuration shown in FIG. 13, the diffusing plate 110 and the optical plate 120 according to the present invention are stacked each other in a closely adhered configuration to form a natural air gap (A), as described in the forgoing. In this embodiment, another configuration will be described. That is, the air gap according to the present invention refers to a material layer with lower refractive index than the diffusing plate; in the present invention a low refractive layer is implemented by forming the air gap, but formation of an additional transparent resin layer is also available. In this case, the beam to be refracted as the dotted line will be refracted as the solid line due to the refractive index of the low refracting layer 130. And the beam passing through the low refracting layer 130 will be refracted downwards once again along the lens pattern 124 on the surface of the optical plate, being a light collecting layer with higher refractive index than the low refracting layer 130 allowing light collection. Accordingly, lighting member of the present invention is capable of reducing a Glare by the low refracting layer 130 primarily, and may satisfy UGR value properly by reducing the Glare secondarily through the light collecting layer 130. For material for the low refracting layer, anyone among OCA (optically clear adhesive), UV adhesive or UV resin may be used. In addition, beads or air bubbles may be formed within the diffusing plate 110.

Figure 14:
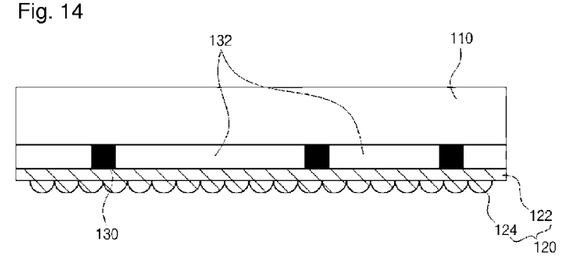
FIGS. 14 to 16 are views showing the embodiments of air gaps between the diffusing plate and the optical plate in FIG. 5.

In FIG. 14, a different embodiment from the embodiments of air gaps between the diffusing plate 110 and the optical plate 120 in the configuration shown in FIG. 5. In other words, the configuration in FIG. 5 forms a natural air layer since additional adhesive material is not used for stacked configuration of the diffusing plate 110 and the optical plate 120, however in the embodiment of the present invention the configuration is characterized by the patterning to form the air gap. As in the configuration illustrated, the air gap may be formed between the optical plate 120 and the diffusing plate 110. In the configuration illustrated, an embodiment is shown so that an air gap 132 with uniform interval may be formed between the optical plate 120 and the diffusing plate 110 by pattering the adhesive layer 130, however a tiny air gap may be formed also when stacking the optical plate 120 and the diffusing plate 110 into a configuration adhered each other without any additional adhering layer, and securing them with additional fixing material.

Such an air gap enables to reduce UGR in such a manner that a beam which passed through the diffusing plate 110 is refracted by the air gap and goes into the optical plate 120, and thus the beam scattering from side to side greatly among the beams applied to the air gap after passing through the diffusing plate 110 is refracted and advances towards the light collecting layer causing reduction of UGR value. Of course, in this case, the optical plate will have values of Fill Factor and sag according to the present invention that were described in the forgoing.

Additionally, the ratio of the air gap 132 to the area of the adhesive layer 130 in FIG. 14, and the ratio of the air gap 114 to the area of the surface in contact with the diffusing plate 110 and the optical plate 120 are important factors and it is preferably for the values to be from 6:4 to 9:1.

Figure 15:
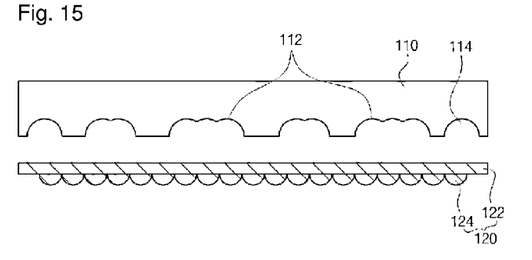

FIG. 15 is another embodiment of the air gap configuration being formed differently from FIG. 14 in that the pattern is generated on one surface itself without utilizing additional adhesive material and the air gap 114 is formed when closely adhered to the optical plate 120. In other words, in the embodiment of the present invention described in the forgoing, a natural air gap is formed between the diffusing plate and the optical plate without additional patterning or the air gap is formed using the adhesive layer, however in this embodiment, the air gap is formed by engraving the pattern in intaglio or carving the pattern in relief (hereinafter, called 'air pattern') on one surface of the diffusing plate aggressively.

Figure 16:
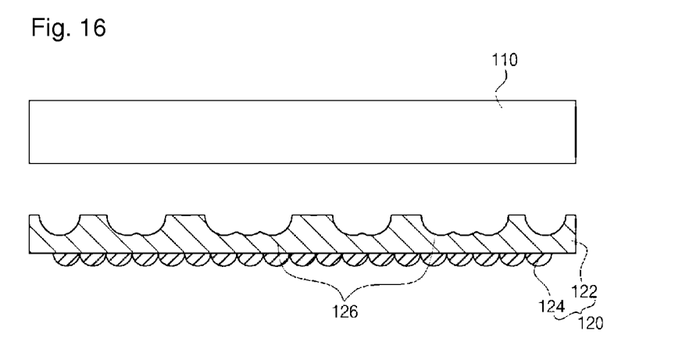

In other words, the air gap 114 can be formed by generating a concave air pattern 112 on the light emitting surface of the sheet or plate forming the diffusing plate 120. Otherwise, as in FIG. 16, the air gap may be also formed by pattering the backside of the surface forming the micro-lens pattern 124 of the optical plate.

In more detail, the beam passing through the diffusing plate 110 and the air gap 114 and then directing towards the optical plate 120 goes into the optical plate 120 directly from the diffusing plate 110 or goes into the optical plate 120 after colliding with the air pattern 112 of the diffusing plate 110 and being reflected.

Like this, the beam passing through the air gap 114 only and the beam passing through the air gap 114 while being reflected by the air pattern 112 of the diffusing plate 110 goes into the light collecting layer, namely the optical plate 120 and is refracted according to the lens pattern 124 of the optical plate 120, and then the light is collected. In this case, it is preferable that the refractive index of the optical plate 120 is higher than 1, which is the refractive index of the air, so that the beam passing through the air gap 114 may be refracted downwards.

Accordingly, lighting member of the present invention is capable of reducing the Glare by the air pattern 112 of the diffusing plate 110 primarily, and may satisfy UGR value more properly by reducing the Glare secondarily through the optical plate 120.

According to the present invention, UGR reduction efficiency may be reduced by establishing a stable configuration provided with the frame portion for efficient mounting and fixing through simultaneous insertion of the optical plate and the diffusing plate into a lighting unit and by forming a natural air gap configuration.

Further, the lighting device has an efficient UGR standard through the reduction of light flux emitting from the angle between 65 deg and 90 deg by adjusting sag or pattern Fill Factor of the optical plate wherein a micro-lens array is patterned on a transparent plate.

In addition, UGR reduction efficiency may be maximized with the lighting unit provided with a configuration comprising an air gap between the optical plate and the diffusing plate.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A lighting device comprising:
   a printed circuit board mounted with a light source;
   a frame portion being formed at a peripheral portion of an area where the light source is arranged; and
   an inserting portion into which a diffusing plate and an optical plate are inserted, which is provided on an inside of the frame portion;
   wherein the diffusing plate is disposed above the optical plate, and
   wherein the frame portion is disposed both above the diffusing plate and below the optical plate such that the frame portion supports the diffusing plate and the optical plate from both above and below and inhibits the diffusing plate and the optical plate from moving in an upward direction or a downward direction.

2. The lighting device of claim 1, wherein the frame portion comprises:
   a first frame accommodating the printed circuit board; and
   a secondary frame establishing the inserting portion by forming a spaced portion while being connected to the first frame as a separable configuration.

3. The lighting device of claim 2, wherein the first frame comprises a base portion in which the printed circuit board is arranged and a border partition wall forming in a shell of the base portion.

4. The lighting device of claim 3, wherein the second frame comprises a shell frame which corresponds to the border partition wall and a central part of which is opened, and a guide frame bent in a direction of the central part at the shell frame to form the spaced portion.

5. The lighting device of claim 4, wherein the guide frame comprises:
   a first guide portion where an upper part of the border partition wall and an end of the guide frame are adhered closely; and
   a secondary guide portion implementing the spaced portion being spaced from the upper surface of the border partition wall by forming a step from the first guide portion wherein respective one ends of the diffusing plate and the optical plate are inserted and fixed to the spaced portion.

6. The lighting device of claim 2, wherein the optical plate and the diffusing plate are inserted and fixed to the inserting portion simultaneously as a stacked configuration wherein an air gap is formed at a closely adhered surface of the optical plate and the diffusing plate.

7. The lighting device of claim 2, wherein the optical plate to be inserted into the inserting portion is an optical plate for collecting light on a surface of which a micro-lens pattern is formed.

8. The lighting device of claim 7, wherein the optical plate and the diffusing plate are inserted and fixed to the inserting portion simultaneously as a stacked configuration wherein an air gap is formed at a closely adhered surface of the optical plate and the diffusing plate.

9. The lighting device of claim 1, wherein the optical plate and the diffusing plate are inserted and fixed to the inserting portion simultaneously as a stacked configuration wherein an air gap is formed at a closely adhered surface of the optical plate and the diffusing plate.

10. The lighting device of claim 9, wherein a reflecting layer is formed on a surface of the printed circuit board and on an inner surface of a lighting device body.

11. The lighting device of claim 9, wherein the optical plate is provided with a plurality of micro-lens patterns formed on a base plate wherein sag (Lens Height (H):Lens Diameter (R)) of the micro-lens pattern is within a range of 0.1 to 0.25 or within a range of 0.35 to 0.5.

12. The lighting device of claim 11, wherein the micro-lens pattern has any one shape among round, oval, prism, lenticular, and R-prism.

13. The lighting device of claim 11, wherein the micro-lens patterns have a plurality of lens patterns of the same or different sizes, which are distributed evenly or unevenly.

14. The lighting device of claim 9, wherein the optical plate is provided with a plurality of micro-lens patterns formed on a base plate wherein Fill Factor of the micro-lens pattern is within a range of 0.5 to 1.0.

15. The lighting device of claim 14, wherein sag (Lens Height (H):Lens Diameter (R)) of the micro-lens pattern is within a range of 0.1 to 0.5.

16. The lighting device of claim 14, wherein a size of a unit lens pattern of the micro-lens pattern has a range of 20 µm to 80 µm.

17. The lighting device of claim 9, wherein the air gap is provided by patterning air pattern on one surface of the diffusing plate being closely adhered to a surface not forming a micro-lens pattern of the optical plate.

18. The lighting device of claim 9, wherein the air gap is provided by patterning a rear part of a surface on which a micro-lens pattern of the optical plate is formed.

* * * * *